United States Patent
Niimi et al.

(10) Patent No.: US 6,326,716 B1
(45) Date of Patent: Dec. 4, 2001

(54) BRUSH HOLDER ARRANGEMENT OF DC MOTOR

(75) Inventors: Masami Niimi, Handa; Akifumi Hosoya, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/511,077

(22) Filed: Feb. 23, 2000

(30) Foreign Application Priority Data

| Feb. 22, 1999 | (JP) | 11-363770 |
| Feb. 25, 1999 | (JP) | 11-048599 |
| Nov. 11, 1999 | (JP) | 11-320436 |

(51) Int. Cl.⁷ .................................................. H01R 39/38
(52) U.S. Cl. .................. 310/239; 310/242; 74/6
(58) Field of Search .................... 310/239, 242, 310/246, 241, 91, 71, 299; 74/7 A, 7 R

(56) References Cited

U.S. PATENT DOCUMENTS

| 4,166,968 | * | 9/1979 | Prittie ..................... 310/239 |
| 4,340,832 | * | 7/1982 | Cheetham et al. ............ 310/239 |
| 4,355,253 | * | 10/1982 | Vollbrecht .................. 310/239 |
| 4,371,803 | * | 2/1983 | Schindel et al. ............. 310/242 |
| 4,413,200 | * | 11/1983 | Fenicle ..................... 310/239 |
| 4,600,850 | * | 7/1986 | Mazzorana et al. ........... 310/242 |
| 4,800,313 | * | 1/1989 | Warner et al. ............... 310/242 |
| 4,843,274 | * | 6/1989 | Paisley ..................... 310/239 |
| 4,881,416 | * | 11/1989 | Isozumi ..................... 74/7 A |
| 5,053,665 | * | 10/1991 | Yamaguchi et al. ............ 310/239 |
| 5,443,553 | * | 8/1995 | Shiga et al. ................ 74/7 R |
| 5,532,536 | * | 7/1996 | Gaspar ...................... 310/239 |
| 5,717,271 | * | 2/1998 | Aoki et al. ................. 310/242 |
| 5,821,662 | | 10/1998 | Kajino et al. ............... 310/239 |
| 5,969,458 | * | 10/1999 | Yumiyama et al. ............. 310/239 |
| 6,031,313 | * | 2/2000 | Sugai et al. ................ 310/239 |
| 6,133,665 | * | 10/2000 | Prell et al. ................ 310/239 |
| 6,169,351 | * | 1/2001 | Bohart et al. ............... 310/239 |

FOREIGN PATENT DOCUMENTS

| 1613371 | * | 5/1970 | (DE) . |
| 0219681 | * | 4/1987 | (EP) . |
| 0 359 603 A1 | | 3/1990 | (EP) . |
| 0 397 973 A2 | | 11/1990 | (EP) . |
| 2530885 | * | 7/1982 | (FR) . |
| 2118377 | * | 10/1983 | (GB) . |
| 60-111370 | | 7/1985 | (JP) . |
| 63-143040 | | 9/1988 | (JP) . |
| 7-194066 | | 7/1995 | (JP) . |

* cited by examiner

Primary Examiner—Joseph Waks
(74) Attorney, Agent, or Firm—Pillsbury Winthrop LLP

(57) ABSTRACT

A DC motor includes an armature, an armature shaft, a commutator, a plurality of brushes in contact with the commutator, a plurality of brush springs for respectively biasing the brushes against the commutator, and a brush holder unit for holding the pair of brushes. Each of the brush springs comprises a springy spring body disposed at a side of corresponding one of the brushes and a spring arm extending from the spring body to bias the rear end of the corresponding one of the brushes against the commutator, and the spring body has an outer periphery disposed within the axial length of the corresponding one of the brushes.

6 Claims, 4 Drawing Sheets

BRUSH HOLDER ARRANGEMENT OF DC MOTOR

CROSS REFERENCE TO RELATED APPLICATION

The present application is based on and claims priority from Japanese Patent Applications: Hei 11-48599, filed Feb. 25, 1999; Hei 11-320436, filed Nov. 11, 1999; and Hei 11-363770, filed Dec. 22, 1999; the contents of which are incorporated herein by reference.

BACKGROUND OF THE INVENTION

1. Field of the Invention

The present invention relates to a DC motor which is suitable for a vehicle starter.

2. Description of the Related Art

As a prior art, a starter is disclosed in JP-U-63-143040. The motor of this starter has a face-contact commutator. The face-contact commutator has a surface perpendicular to an armature shaft to be in contact with a pair of brushes. There is a difference between this face-contact commutator and a common cylindrical commutator in that: it is necessary for the cylindrical commutator to have an axial marginal length for receiving the brushes, while it is not necessary for the face-contact commutator to have the same. In other words, the face-contact commutator is effective to shorten the axial length of the motor.

The motor disclosed in the publication has compression coil springs for biasing the brushes against a commutator. Compression coil springs are disposed at the rear end of brushes opposite to the commutator. If the spring constant of the coil spring is lowered and the initial spring is increased to provide a sufficient spring force for a long time until the brushes are worn away, the total length of springs is increased. That is, although the face-contact commutator shortens the length of the armature, the total length of the motor can not be reduced.

If the spring force is increased to shorten its length, the springs may be fatigued shortly due to heat of the motor.

As disclosed in JP-A-7-194066, a resinous holder holding a brush holder thereon is fastened to a bracket by a bolt, and the bracket together with a torque sensor unit disposed thereon is also fastened to a flange of motor casing by bolts. Through holes are formed in the bracket and the flange and female screw holes are formed in the torque sensor unit. Because the inside diameter of the through holes is larger than the outside diameter of the bolts, clearances are formed between the bolts and the bracket's through holes. As a result, the bracket may move in the clearances, and this makes the circumferential positioning difficult.

Even after the motor casing and the brush holder have been assembled, the bracket may move within the clearance due to vibration. This changes circumferential position of the brush holder relative to the yoke.

In addition, the torque sensor and the motor casing with the bracket interposed therebetween necessitate to align three through holes thereof with each other.

SUMMARY OF THE INVENTION

The present invention has been made in view of the above circumstances and has a main object to reduce the total length of a DC motor.

According to a main feature of the invention, each brush spring has a springy spring body and a spring arm extending from the brush body to bias the rear end of one of the brushes, and the spring body is disposed at a side of the one of the brushes within the axial length of the one of the brushes. Accordingly, the total length of the DC motor can be reduced.

Another object of the invention is to provide a DC motor which is easy to position the yoke and brush holder accurately.

The brush holder unit is comprised of a metal brush holder and a resinous holder having a plurality of cavities for respectively accommodating the blush holders. Each of the brush holders has a stopper means for preventing the same from falling away from one of the cavities.

Therefore, the brush holders can be fixed to the resinous holder easily without screws or rivets. Because the mental brush holder is surrounded by resinous material and a distance between the brush holder and an end frame can be provided, sufficient insulation can be provided even if abrasion powders of the brushes due to long use stick to the brush holder. Because the brushes are accommodated by the mental brush holder, the resinous holder is protected from thermal damage even if the brushes are over-heated.

The stopper means may have a support arm which has an edge in engagement with a groove formed in the resinous holder. If the support arm is applied reaction force of the brush spring, the support arm and the brush holder are prevented by the edge of the support arm from deforming.

The commutator of the DC motor may be a face-contact commutator whose surface is perpendicular to a shaft of the armature.

According to another feature of the invention, a rubber bushing is fixed to the brush holder unit so that the yoke and the brush holder unit are positioned with the rubber bushing interposed therebetween. This, prevents slippage of the brush holder unit in the circumferential direction.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
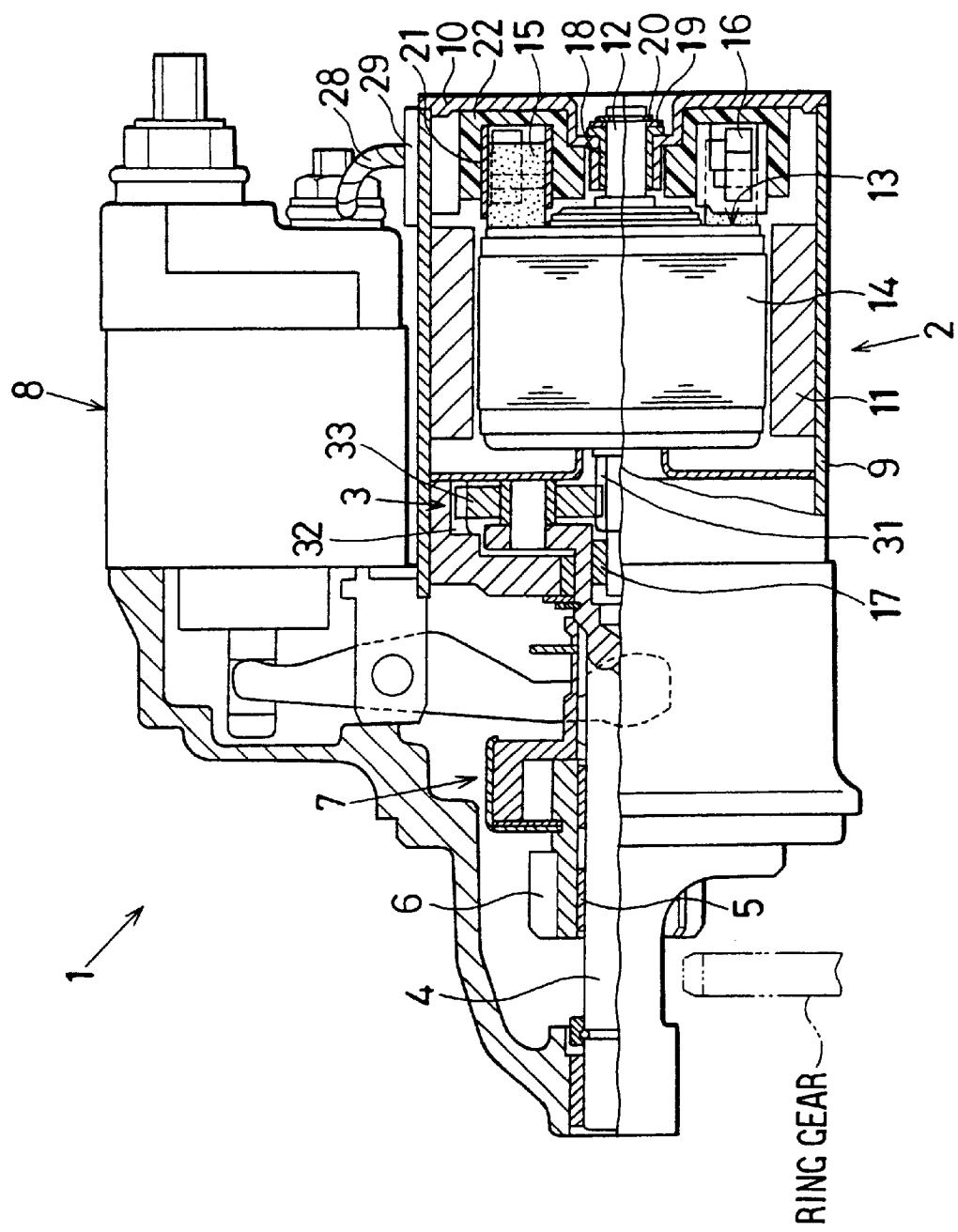
FIG. 1 is a cross-sectional side view of a starter motor according to a first embodiment of the invention.

A DC motor according to the invention is described with reference to the appended drawings.

(First Embodiment)

A starter motor having a brush holder unit according to a first embodiment is described with reference to FIGS. 1–7.

Starter 1 is comprised of DC motor 2, reduction unit 3 for reducing rotation speed of motor 2, output shaft 4 for transmitting the torque of motor 2, pinion gear 6 which is engaged with a ring gear of an engine when engine is started, one way clutch 7 which transmits the rotation of output shaft 4 to pinion gear 6, and magnet switch 8 which turns on or off motor's contacts (not shown) of a motor driving circuit (not shown).

Reduction unit 3 is comprised of a sun gear 31 having external teeth around armature shaft 12, ring-shape internal gear 32 having internal teeth surrounding sun gear 31, planetary gear 33 interposed between sun gear 31 and internal gear 32 in mesh with sun and internal gears 31, 32. Planetary gear 33 rotates on its own axis and revolves around sun gear 31, so that the rotation of planetary gear 33 can be transmitted to output shaft 4 via pin 19.

Output shaft 4 is disposed in front of armature 14 to align with armature shaft 12. The front end of output shaft 4 is supported by a front housing via a bearing, and the rear end thereof is supported by bearing support via bearing 17. Internal gear 32 is fitted to the inner periphery of yoke 9 to be rotation-controlled.

Pinion gear 6 is slidable fitted to the outer periphery of output shaft 4 via bearing 5 so as to move forward on output shaft 4 to engage the ring gear, thereby transmitting the rotation of output shaft 4 to the ring gear.

One way clutch 7 is fitted to a helical spline, which is formed on the outer periphery of output shaft 4, to be movable together with pinion gear 6. One way clutch 7 transmits the rotation of output shaft 4 to pinion gear and cut the connection between output shaft 4 and pinion gear 6 if an engine rotates pinion gear 6 at a speed higher than the rotation speed of output shaft 4.

Magnet switch 8 opens or closes internal contacts as a built-in plunger (not shown) moves and moves pinion gear 6 via a lever back and forth together with one-way clutch 7 on output shaft 4.

Motor 2 is comprised of cylindrical yoke 9 made of soft iron, end frame 10 for closing the rear opening of yoke 9, stator poles 11 (e.g. permanent magnets) disposed on the cylindrical inner periphery of yoke 9, armature 14 which has face-contact commutator 13 whose surface is perpendicular to armature shaft 12, and a brush holder unit 15 which holds two pairs of positive brush 151 and negative brush 152 and their brush springs 16. The pairs of brushes 151, 152 slidable in contact with commutator 13, and brush springs 16 respectively press the pair of brushes 151, 152 against commutator 13.

In armature 14, one end of armature shaft 12 is supported by bearing 17 at the inner periphery of cylindrical cavity formed at the rear end of output shaft 4 and the other end is supported by bearing 18 at the inner periphery of a cylindrical portion formed at the central portion of end frame 10. Washer 19 and stopper ring 20 are fitted to a portion of the other end of armature shaft 12 rearward from bearing 18, so that armature 14 is restricted to move in the axial direction.

Brush holder unit 15 is comprised of four cylindrical metal brush holders 21 and resinous holder 22 for supporting brush holders 21. Resinous holder 22 has four cavities 22a having inner wall 22b and four grooves 22c, and brush holders 21 are respectively inserted into four cavities 22a.

Figure 5:
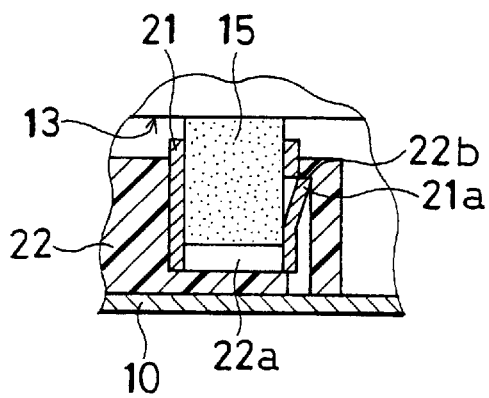
FIG. 5 is a cross-sectional view of the portion shown in FIG. 2 cut along line C—C.
Figure 6:
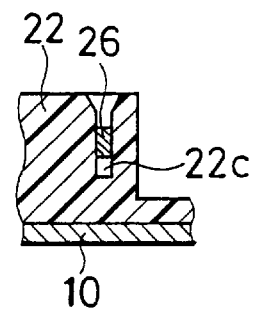
FIG. 6 is a cross-sectional view of the portion shown in FIG. 2 cut along line D—D.

Each of brush holders 21 is made of a metal plate, which is shaped into a rectangular pipe. Each is inserted into one of cavities 22a. Each of brush holders 21 has claw 21a extending from one side thereof and support arm 26 integrated therewith. A stopper, e.g., a claw 21a, engages inner wall 22b to prevent brush holder 21 from falling away from cavity 22a, as shown in FIG. 5. An edge of support arm 26 engages one of grooves 22c as shown in FIG. 6.

Figure 2:
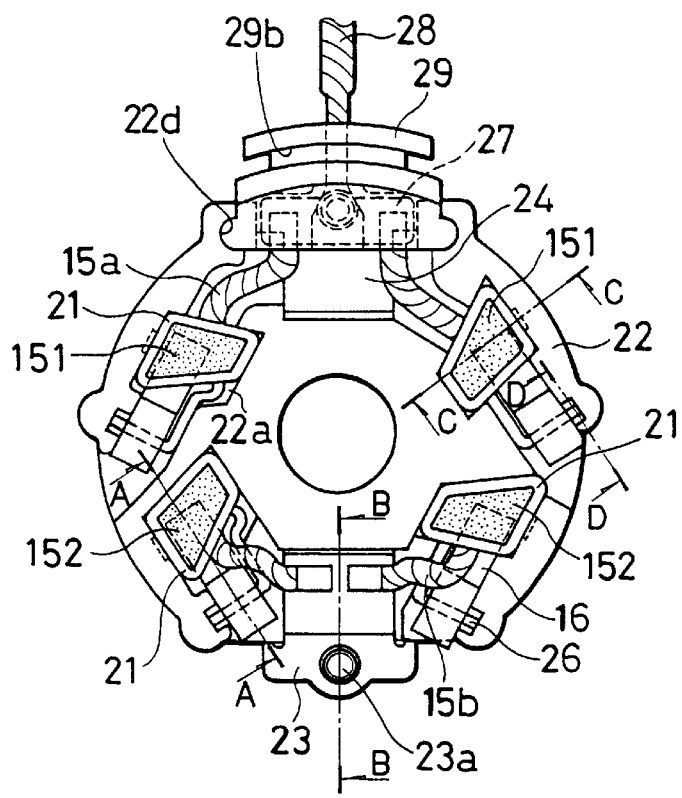
FIG. 2 is a front view of a brush holder unit viewed from the side of an armature of the starter motor.

Resinous holder 22 is fastened to end frame 10 by a pair of metal member 23 and 24 and bolts. Metal members 23 and 24 are respectively disposed at opposite portions around the center of hole 15a. As shown in FIG. 2, resinous holder 22 also has U-shaped opening 22d at an upper edge thereof to have rubber bushing 29 press-fitted therein. U-shaped opening 22d has semicircular hollows formed at opposite peripheral sides at a certain interval.

Rubber bushing 29 has semicircular press-fit portions 30a to be press-fitted to the hollows of U-shaped opening 22d and engagement groove 30b to be engaged with U-shaped opening 22d.

Brush holder unit 15 also has a pair of positive brushes 151 and a pair of negative brushes 152, which are slidable held inside the cylindrical portion of brush holders 21.

Thus, brush holder 22 can be fixed to resinous holder 22 easily without screw or rivet. Brush holder 22 is surrounded by resinous holder 21, and the distance between brush holder 21 and end frame, which is grounded, can be made long enough to insulate brush holder 21. Even if brush abrasion powders stick to brush holder 21, the same can be insulated for a long time. If brushes 15 are overheated, resinous holder 22 can be protected by brush holder 21 from heat damage.

Each of positive brushes 151 has a pigtail 15a which is welded to conductive metal member 27. Lead wire 28 is connected to metal member 27 and a motor contact (stationary contact) of magnetic switch 8. Lead wire 28 is held by rubber bushing 29 fitted in a side opening of yoke 9 and insulated by the same from yoke 9.

Each of negative brushes 152 has pig tail 15b which is connected to metal member 23 which is grounded. Metal member 23 functions as an earth terminal for negative brushes 152.

Figure 3:
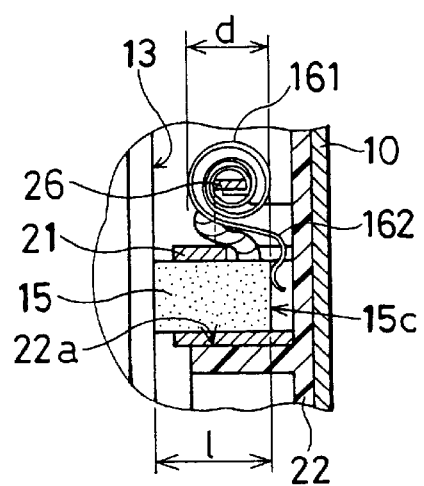
FIG. 3 is a cross-sectional view of the portion shown in FIG. 2 cut along line A—A.

As shown in FIG. 3, each of brush springs 16 is comprised of spirally wound spring body 161 made of a long thin metal strip and springy arm extending from the outermost portion of spring body 161. The edge of springy arm 162 biases rear surface 15c of brush 15 against commutator 13. Spring body 161 is disposed on one side of brush 15 so that brush springs 16 can be supported by support arms 26 as described above. Spring body 161 is disposed so that the outside diameter d thereof can be disposed within the axial length 1 of brushes 151, 152.

Thus, spring force is accumulated in the spirally wound spring body 161. As a result, even if brushes 151, 152 are worn away until a worn-away limit, brushes 151, 152 can be properly biased by springy arms 162.

Because each spring body 161 is disposed within the axial length 1 of one of brushes 151, 152, the total length of motor 2 is shortened significantly.

Brush springs 16 are not required to position at the rear of brushes 151, 152, and brush body 161 can be disposed at one side of each of brushes 151, 152. A coil spring made of a piano wire can be used as spring body 161.

Figure 4:
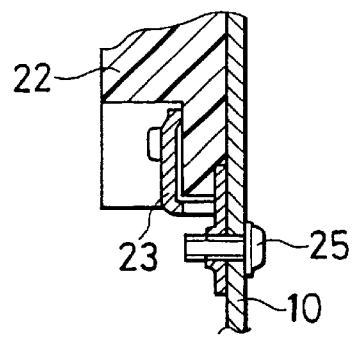
FIG. 4 is a cross-sectional view of the portion shown in FIG. 2 cut along line B—B.

In assembling, press-fit portions 30a of rubber bushing 29 are press-fitted to the hollows of opening 22d. Then, groove 29b of rubber bushing 29 is press-fitted into opening 22d through the side opening of yoke 9. Subsequently, end frame 10 is placed at the back of brush holder unit 15, and, as shown in FIG. 4, bolt 25 is screwed into female screw of metal member 23 through a hole of end frame 10, thereby fixing brush holder unit 15 to end frame 10.

Thereafter, through bolts (not shown) are inserted from back of end frame 10 to screw into the front housing to fix the front housing, yoke 9 and end frame 10 together.

(Second Embodiment)

Figure 7:
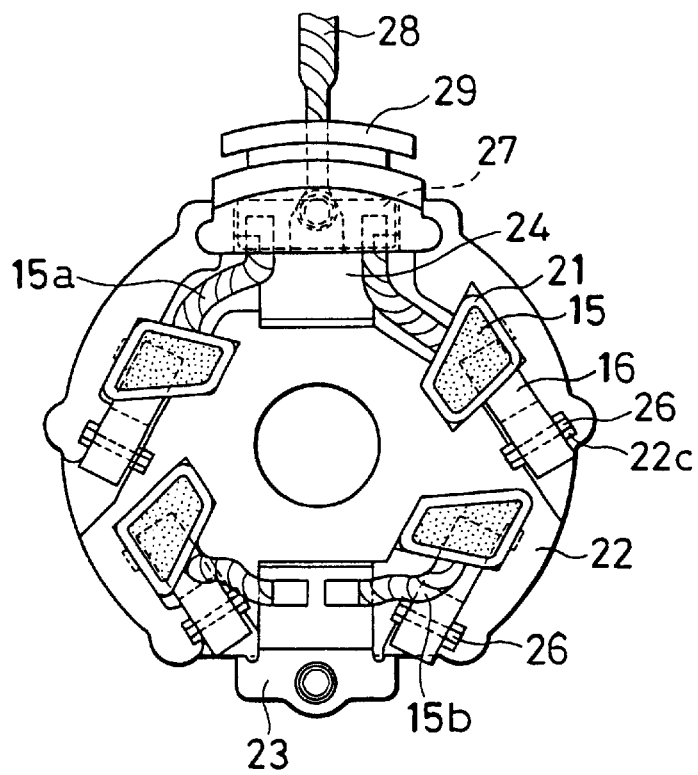
FIG. 7 is a front view of a brush holder unit according to a second embodiment of the invention.

As shown in FIG. 7, support arm 26 is formed separately from brush holder 21. Support arm 26 is made of a simple plate or rod having a suitable length and opposite ends thereof are engaged with grooves 22*c* of resinous holder 22, as in the first embodiment. Thus, brush holders 21 can be manufactured more easily than the first embodiment.

Because opposite ends of support arm 26 are engaged with grooves 22*c*, deformation due to the reaction force of brush spring 16 can be prevented effectively.

(Third Embodiment)

Figure 8:
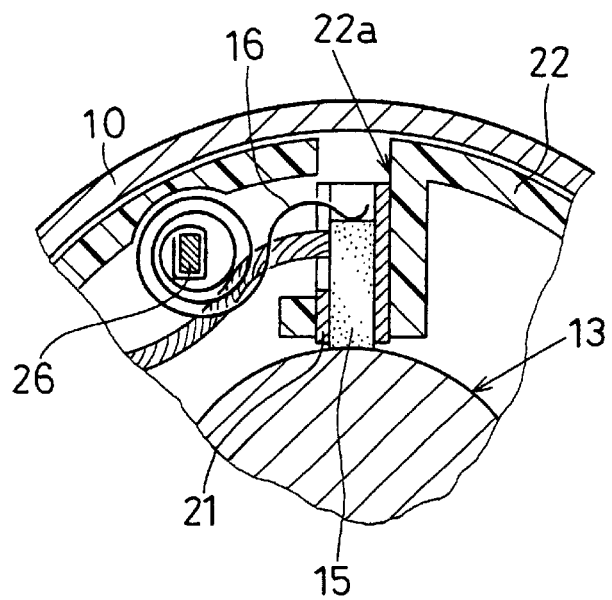
FIG. 8 is a fragmentary cross-sectional view of a brush holder unit according to a third embodiment of the invention.
Figure 9:
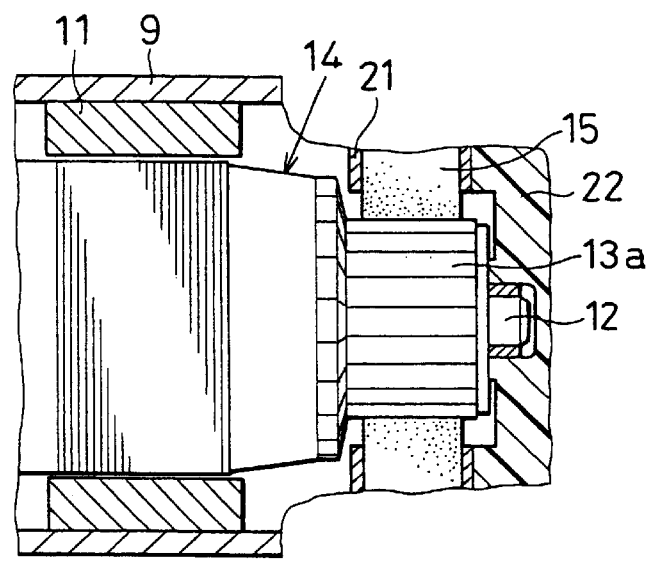
FIG. 9 is a fragmentary cross-sectional side view of the armature having the brush holder unit according to the third embodiment.

Armature 14, as shown in FIGS. 8 and 9, is provided with a cylindrical commutator having a plurality of commutator segments 13*a* around armature shaft 12 and brushes 151, 152.

Resinous holder 22 is fastened to end frame 10 by screws or the like and has cavities 22*a* for accommodating brush holder 21. Cavities 22*a* penetrate resinous holder 22 in the radial direction of commutator 13. Therefore, brush holder 21 can be inserted into cavity 22*a* either from the side of commutator 13 or the side of end frame 10. Each of brush holders 21 is held by support arm 26 in the same manner as in the first embodiment.

Each of brush springs 16 is a spirally wound type as in the first embodiment and disposed at a side of brush holders as shown in FIG. 8, and supported by one of support arms 26. Brushes 151, 152 are respectively inserted in the cylindrical inside of brush holders 21 and biased by brush springs 16 against commutator 13.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A DC motor including an armature, an armature shaft, a commutator and a brush holder unit having a plurality of brushes in contact with said commutator and a plurality of brush springs for respectively biasing said brushes against said commutator, wherein said commutator comprises a face-contact commutator having a brush contact surface perpendicular to said armature shaft, each of said brush springs comprises a spring body disposed at a side of a corresponding one of said brushes opposite said brush contact surface and a spring arm extending from said spring body to bias the corresponding one of said brushes against said commutator, and said spring body has an outer periphery disposed within the axial length of said corresponding one of said brushes.

2. The DC motor according to claim 1, wherein said brush holder unit comprises a resinous holder having a plurality of cavities and a plurality of brush holders for slidable holding said brushes respectively disposed in said cavities, and each of said brush holders has stopper means engaging said resinous holder for preventing the brush holders from falling away.

3. The DC motor according to claim 2, wherein said stopper means comprises a support arm, and said resinous holder has a plurality of grooves each of which holds said support arm.

4. The DC motor according to claim 2, wherein said stopper means comprises a support arm, and said resinous holder has a plurality of grooves each of which holds a support arm.

5. The DC motor according to claim 2, further comprising a yoke having a plurality of stator poles;

a rubber bushing for holding a lead wire extending from the inside of said yoke toward outside said yoke;

wherein said rubber bushing is fixed to said brush holder unit so that said yoke and said brush holder unit are positioned with said rubber bushing interposed therebetween.

6. The DC motor according to claim 5, wherein said rubber bushing is made of rubber in a compressed state.

* * * * *

UNITED STATES PATENT AND TRADEMARK OFFICE
CERTIFICATE OF CORRECTION

PATENT NO. : 6,326,716 B1
DATED : December 4, 2001
INVENTOR(S) : Niimi et al.

It is certified that error appears in the above-identified patent and that said Letters Patent is hereby corrected as shown below:

Title page,
Item [30], should read as follows:

-- [30] Foreign Application Priority Data

December 22, 1999 (JP) .................................................... 11-363770
February 25, 1999 (JP) .................................................... 11-048599
November 11, 1999 (JP) .................................................... 11-320436 --

Signed and Sealed this

Seventh Day of May, 2002

Attest:

Attesting Officer

JAMES E. ROGAN
Director of the United States Patent and Trademark Office